United States Patent
Dubnicki et al.

(10) Patent No.: US 7,304,994 B2
(45) Date of Patent: Dec. 4, 2007

(54) PEER-TO-PEER SYSTEM AND METHOD WITH PREFIX-BASED DISTRIBUTED HASH TABLE

(75) Inventors: Cezary Dubnicki, Monmouth Junction, NJ (US); Cristian Ungureanu, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 829 days.

(21) Appl. No.: 10/813,504

(22) Filed: Mar. 30, 2004

(65) Prior Publication Data

US 2005/0135381 A1  Jun. 23, 2005

Related U.S. Application Data

(60) Provisional application No. 60/461,397, filed on Apr. 9, 2003.

(51) Int. Cl.
*H04L 12/28* (2006.01)

(52) U.S. Cl. ............... 370/392; 370/471; 711/221; 711/216

(58) Field of Classification Search ............... None
See application file for complete search history.

(56) References Cited

U.S. PATENT DOCUMENTS

| | | | |
|---|---|---|---|
| 5,544,347 A | 8/1996 | Yanai et al. | |
| 5,742,792 A | 4/1998 | Yanai et al. | |
| 5,799,299 A * | 8/1998 | Fujiwara | 707/3 |
| 5,909,692 A | 6/1999 | Yanai et al. | |
| 6,092,066 A | 7/2000 | Ofek | |
| 6,101,497 A | 8/2000 | Ofek | |
| 6,108,748 A | 8/2000 | Ofek et al. | |
| 6,421,730 B1 | 7/2002 | Narad et al. | |
| 6,704,730 B2 | 3/2004 | Moulton et al. | |
| 6,728,223 B1 | 4/2004 | Litzenberger et al. | |
| 6,738,762 B1 * | 5/2004 | Chen et al. | 707/3 |
| 6,807,632 B1 | 10/2004 | Carpentier et al. | |
| 6,810,398 B2 | 10/2004 | Moulton | |
| 6,826,711 B2 | 11/2004 | Moulton et al. | |
| 7,058,725 B2 * | 6/2006 | Mathew et al. | 709/238 |
| 2001/0037323 A1 | 11/2001 | Moulton et al. | |
| 2002/0048284 A1 | 4/2002 | Moulton et al. | |
| 2002/0107722 A1 | 8/2002 | Laurin et al. | |
| 2003/0179750 A1 | 9/2003 | Hasty, Jr. et al. | |

OTHER PUBLICATIONS

Stoica, I. et al., "Chord: a Scalable peer-to-peer lookup service for internet applications", in SIGCOMM'01, Aug. 2001.
Ratnasamy, S. et al., "A Scalable Content-Addressable Network", in SIGCOMM'01, Aug. 2001.
Hildrum, K. et al., "Distributed Object Location in a Dynamic Network", in SPAA'01, Aug. 2002.
Malkhi, D. et al., "Viceroy: A Scalable and Dynamic Emulation of the Butterfly", in PODC'02, Jul. 2002.
Cox, R. et al., "Serving DNS Using a Peer-to-Peer Lookup Service", in 1st International Workshop on Peer-to-Peer Systems, 2002.

(Continued)

*Primary Examiner*—Duc Ho

(57) ABSTRACT

An architecture for a peer-to-peer network is disclosed which advantageously is able to maintain short fixed path length routing as the network grows.

28 Claims, 7 Drawing Sheets

OTHER PUBLICATIONS

Rowstron, A. et al., "Pastry" Scalable, decentralized object location and routing for large-scale peer-to-peer systems, in Proceedings of the 18th IFIP/ACM International Conference on Distributed Systems Platforms, Nov. 2001.

Zhao, B.Y. et al., "Tapestry: An Infrastructure for Fault-tolerant Wide-Area Location and Routing", Technical Report No. UCB/CSD-01-1141, Computer Science Division, University of California, Apr. 2001.

Maymounkov, P. et al., "Kademlia: A peer-to-peer information system based on the XOR metric", in Proceedings of the 1st International Workshop on Peer-to-Peer Systems, 2002.

Rowstron, A. et al., "Storage management and caching in PAST, a large-scale, persistent peer-to-peer storage utility", in Symposium on Operating Systems Principles, 2001.

Byers, J. et al., "Simple load balancing for distributed hash tables", in 2nd International Workshop on Peer-to-Peer Systems, 2002.

I. Stoica et al., "CHORD: A Scalable Peer-to-Peer Lookup Service for Internet Applications", Proceedings of the 2001 ACM SIGCOMM'01 Conference, pp. 149-160 (Aug. 2001).

B.Y. Zhao et al., "TAPESTRY: An Infrastructure for Fault-Tolerant Wide-Area Location and Routing", Tech. Rep. UCB/CSD-01-1141, Univ. of California at Berkeley, Computer Science Department Apr. 2001.

A. Rowstron and P. Druschel, "Pastry: Scalable, distributed object location and routing for large-scale peer-to-peer systems", IFIP/ACM International Conference on Distributed Systems Platforms (Middleware), Heidelberg, Germany, pp. 329-350, Nov. 2001.

S. Ratnasamy et al., "A Scalable Content Addressable Network", Proc. of ACM SIGCOMM, pp. 161-172, Aug. 2001.

* cited by examiner

| INDEX | PREFIX |
|---|---|
| 0 | 0000 and 0001 (TWO NODES) |
| 1 | 010 (THIS NODE) |
| 2 | 1000 and 1001 (TWO NODES) |
| 3 | 1100 and 1101 (TWO NODES) |

FIG. 5

PEER-TO-PEER SYSTEM AND METHOD WITH PREFIX-BASED DISTRIBUTED HASH TABLE

This Utility patent application is a Non-Provisional of and claims the benefit of U.S. Provisional Patent Application Ser. No. 60/461,397 filed on Apr. 9, 2003, the contents of which are incorporated by reference herein.

This application relates to U.S. Utility patent application Ser. No. [TO BE ASSIGNED], entitled "PEER-TO-PEER SYSTEM AND METHOD WITH IMPROVED UTILIZATION," filed on Mar. 29, 2004, contemporaneously with this application and incorporated by reference in its entirety.

BACKGROUND OF THE INVENTION

The invention relates to distributed systems and, more particularly, to storage systems that utilize distributed hash tables.

Peer-to-peer ("P2P") systems have become very popular and are a major source of traffic on the Internet today. Still, first generation file sharing systems, such as NAPSTER and GNUTELLA, have been shown to have significant scalability issues. Recently, a number of research groups have proposed a new generation of scalable P2P systems based on distributed hash tables (DHTs). See, e.g., I. Stoica et al., "CHORD: A Scalable Peer-to-Peer Lookup Service for Internet Applications," in Proceedings of the 2001 ACM SIGCOMM '01 Conference, pp. 149-60 (San Diego, Calif., August 2001); B. Y. Zhao, et al., "TAPESTRY: An Infrastructure for Fault-Tolerant Wide-Area Location and Routing," Tech. Rep. UCB/CSD-01-1141, University of California at Berkeley, Computer Science Department 2001; A. Rowston and P. Druschel, "PASTRY: Scalable, Decentralized Object Location, and Routing for Large-Scale Peer-to-Peer Systems," Lecture Notes in Computer Science, Vol. 2218, p. 329, 2001; S. Ratnasamy, et al., "A Scalable Content Addressable Network," in Proc. of ACM SIGCOMM, pp. 161-72 (San Diego, Calif., August 2001). In these systems, a hash key is associated with a file and each node in the system is responsible for storing a certain range of hash keys. A lookup for a particular key is routed through the DHT network to the node responsible for the key using a specific routing algorithm.

The ad-hoc and dynamic nature of conventional P2P networks have motivated existing DHT-based networks to keep only minimal state per node, resulting in long routing paths and systems with poor utilization. Such architectures are not as suitable for commercial P2P applications, where the resource sharing is long-term and resources are contributed in a well-defined manner with predefined local rules of engagement. Accordingly, there is a need for different type of distributed hash table architecture that takes advantage of the nature of the stable dedicated resources to offer better performance than traditional P2P systems.

SUMMARY OF INVENTION

The present invention is directed to new peer-to-peer architecture that is able to maintain short fixed path lengths during the entire lifetime of a system. In accordance with an aspect of the invention, objects in the peer-to-peer network are associated with a hash key of a hash function and a fixed portion of the hash key, e.g., a prefix, is associated with one of a plurality of zones in the peer-to-peer network. The fixed portion comprises a string of bits that is further grouped into a fixed number of disjoint groupings of bits, each group referred to by the inventors as a dimension, and state regarding the groupings of bits is maintained for each zone so as to route messages to a destination zone in a fixed path length. The state for each zone advantageously can be dynamically recomputed if a zone is added to the peer-to-peer network so as to maintain a fixed path length.

In accordance with an embodiment of this aspect of the invention, the state is maintained in a jump table which associates dimension combinations with destination zones in the peer-to-peer network. Where the jump tables are up-to-date, the jump tables can be used to route a message to a destination zone in a maximum number of hops that is equal to the fixed number of groupings of bits. Where the jump tables are not up-to-date, it is advantageous to provide fall-back routing option which preferably is used only to forward the message to a next zone where the jump tables can be tried again. For example, the jump tables can be used to obtain a partial resolution of some of the bits of one of the groupings of bits and/or a table of neighboring nodes can be used to obtain a resolution of at least one of the bits in one of the groupings of bits in accordance with some distance metric to the destination zone. Or a blacklist of zone already tried by the message can be maintained and the message routed to a destination zone not on the blacklist.

These and other advantages of the invention will be apparent to those of ordinary skill in the art by reference to the following detailed description and the accompanying drawings.

SUMMARY OF DRAWINGS

FIG. 5 is an illustrative example of a jump table.

DETAILED DESCRIPTION

Figure 1:
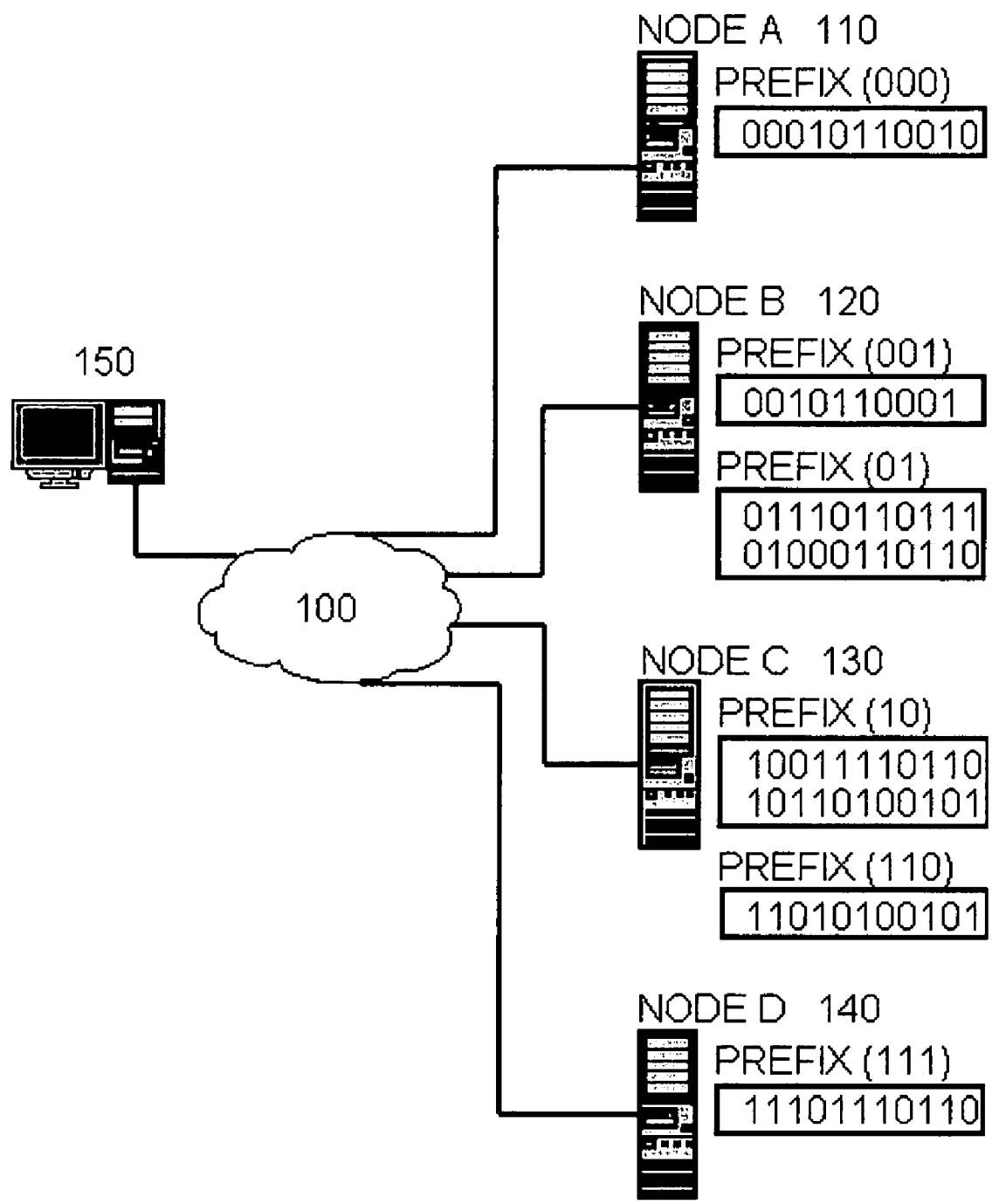
FIG. 1 is a diagram of a commercial peer-to-peer system, configured in accordance with an embodiment of an aspect of the invention.

FIG. 1 is a diagram of a commercial peer-to-peer system, configured in accordance with an embodiment of an aspect of the invention. A plurality of physical nodes, illustratively 110, 120, 130, 140, communicates with each other through an underlying transport network 100. There is no restriction on the location or grouping of the physical nodes 110, 120, 130, 140 with regards to the present invention. The physical nodes can vary in actual storage space, processing power, and other resources.

The physical nodes preferably arrange their storage capacity in what the inventors refer to as a number of fixed size "slots" which can be roughly proportional to the amount of storage available to the physical node. Each physical node is responsible for the storage and retrieval of one or more objects, each object associated with a preferably fixed-size hash key of a hash function. Any advantageous hashing function that maps objects to a fixed-size hash key can be utilized in the context of the present invention. One or more clients 150 can communicate with a physical node and issue a request for a particular piece of data using a hash key.

The hash keys can be viewed as fixed size bit strings in the space containing all possible combinations of such strings. A subspace of the hashkey space is associated with what the inventors refer to as a "zone" as defined by a group of bits of the larger bit string. For example and without limitation, the zone can be defined by a K-bit prefix where K≦S where the hash key space is spanned over S bits. Thus, the prefix $$f_1 f_2 \ldots f_k$$

where $f_i$ is a specific bit, describes a zone which keeps all objects with hashkeys starting with this prefix, i.e. of the form $$f_1 f_2 \ldots f_k x_{k+1} x_{k+2} \ldots x_S$$

where x denotes a variable bit and f denotes a fixed bit.

Figure 2:
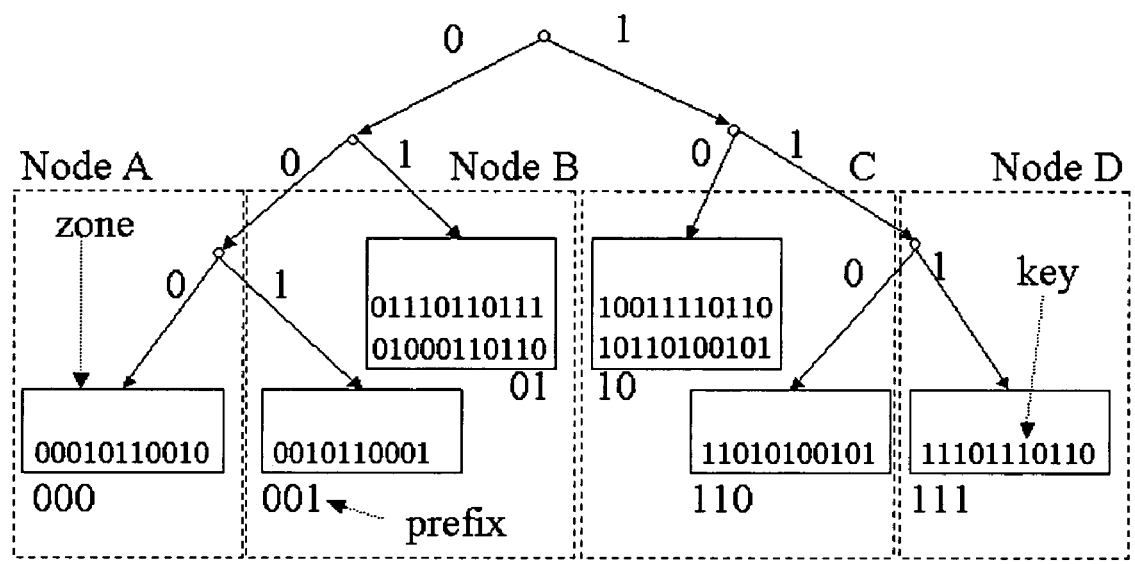
FIG. 2 is an abstract tree diagram of the hash key arrangement depicted in FIG. 1.

FIG. 1 illustrates the organization of the hash keys and the prefixes. In FIG. 1, the object associated with hash key $k_1$=00010110010 is stored at node "A" 110 which is responsible for the zone for prefix=000. Node "B" 120 stores all objects with a prefix of either 001 or 01, e.g., shown as $k_2$=0101100001 for the 001 prefix zone and $k_3$=01110110111 and $k_4$=01000110110 for the 01 prefix zone—and so on. This is also illustrated by the abstract tree diagram shown in FIG. 2.

Each zone of hashkeys is associated with a slot on a physical node so that objects with the corresponding hashkey prefix are stored on the corresponding slot of the particular physical node. Each zone/slot can be represented as and referred to as a node in the "fixed prefix network" (FPN) or as an "FPN node." The prefix assigned to an FPN node would be the FPN's node id. Thus, each physical node could host multiple FPN nodes simultaneously up to the number of slots assigned to it. The global limit on how many hash keys any particular FPN node can keep can be represented by a constant denoted SlotSize.

The notion of "neighbors" in the FPN network can be represented in a number of different arbitrary ways. For example, two nodes, e.g., F and G, are said to be "neighbors" along some bit i if and only if (iff) both the following conditions hold:

$$f_i = \bar{g}_i$$

$$f_j = g_j \text{ for } j \neq i \wedge 1 \leq j \leq \min(\text{len}(F), \text{len}(G))$$

In other words, the ith bit in F is flipped in G and all other bits are equal for bit positions occurring in both prefixes. Two prefixes are "neighbors" iff a bit position exists along which these prefixes are neighbors according to the above definition. Two FPN nodes are neighbors iff their prefixes are neighbors. For illustration, consider zone J from FIG. 3, with fixed prefix 101. Its neighbors are zones C (0010) and D (0011) along the first bit, zones M (1110) and N (1111) along the second bit, and zones H (1000) and I (1001) along the third bit.

The inventors refer to an FPN network as being in a "consistent state" iff any two FPN nodes have non-overlapping prefixes. An FPN is said to provide "full space coverage" iff the entire hashkey space is covered by zones with assigned nodes. In other words, for each possible address there exists an FPN node whose fixed prefix is a prefix of this address. The inventors refer to an FPN network as being in a "stable state" iff it is consistent and provides full coverage. As the previous example shows, a given zone may have more than one neighbor along a given bit position, but for each zone in a stable FPN network and each bit position in its prefix there must be at least one neighbor. Short prefix zones have more neighbors than long prefix zones. However, if zones are balanced in size (within some constant factor), then this number-of-neighbors imbalance is limited. When an FPN network is perfectly balanced, it has power-of-two number of nodes, and its topology can be represented as a binary hypercube.

Each zone can maintain state for routing purposes. For example, and without limitation, a routing table can be maintained that maps zone prefixes to host network addresses (e.g. IP addresses) and contains auxiliary information necessary for keeping these tables up-to-date. In order to detect failures and propagate changes in the network, neighboring zones can monitor each other by periodically exchanging messages referred to as "pings". Each zone, for example, can execute a ping cycle loop consisting of the following steps:

1. Ping Exchange. A zone exchanges ping messages with its neighbors in a fixed interval defined by a system-wide constant. In this step, the node can receive from its neighbors various information described below—and can disseminate its own ping message prepared based on information received by the end of the previous cycle. An initial ping message content may be empty.

2. State Reconciliation. Based on the ping messages received in the previous step, a zone reconciles all received information with its local state and prepares outgoing pings for the next ping exchange phase.

Ping destinations can be described by the destination zone's prefix and this zone host's network IP address. Because of zone transfers, as further described herein, a ping may arrive at a node that no longer hosts the target zone. For this reason, pings can be routed similarly to other messages as further described below.

JUMP TABLE. Besides neighbor tables, each zone maintains state that can be used to maintain fixed length path routing of messages in the fixed prefix network. In accordance with an embodiment of this aspect of the invention, each zone keeps what the inventors refer to as "jump tables", one in each dynamically defined "dimension." A zone fixed prefix is divided into disjoint groups, and each group is called a "dimension." For example, a dimension may comprise of a fixed number of bits starting at a given hashkey bit position—for example, a dimension can be defined by a bit position 4 and a length 3. All combinations of dimension bits are represented by one "digit." A jump table for a given dimension keeps a number of entries equal to all combinations of the dimension bits. Each jump table entry has an index and a prefix associated with it. The entry's index is a particular digit, i.e., a combination of the dimension bits. The entry's prefix is the id of the local FPN node with bits of the associated dimension replaced by this entry's index. The value of the entry is the set of FPN nodes responsible for the entire hashkey space specified by this entry's prefix. Each such FPN node is described by its zone prefix, the host IP address, and, as further described below, the zone version. Jump tables serve to reduce the number of hops and improve resiliency.

Figure 3:
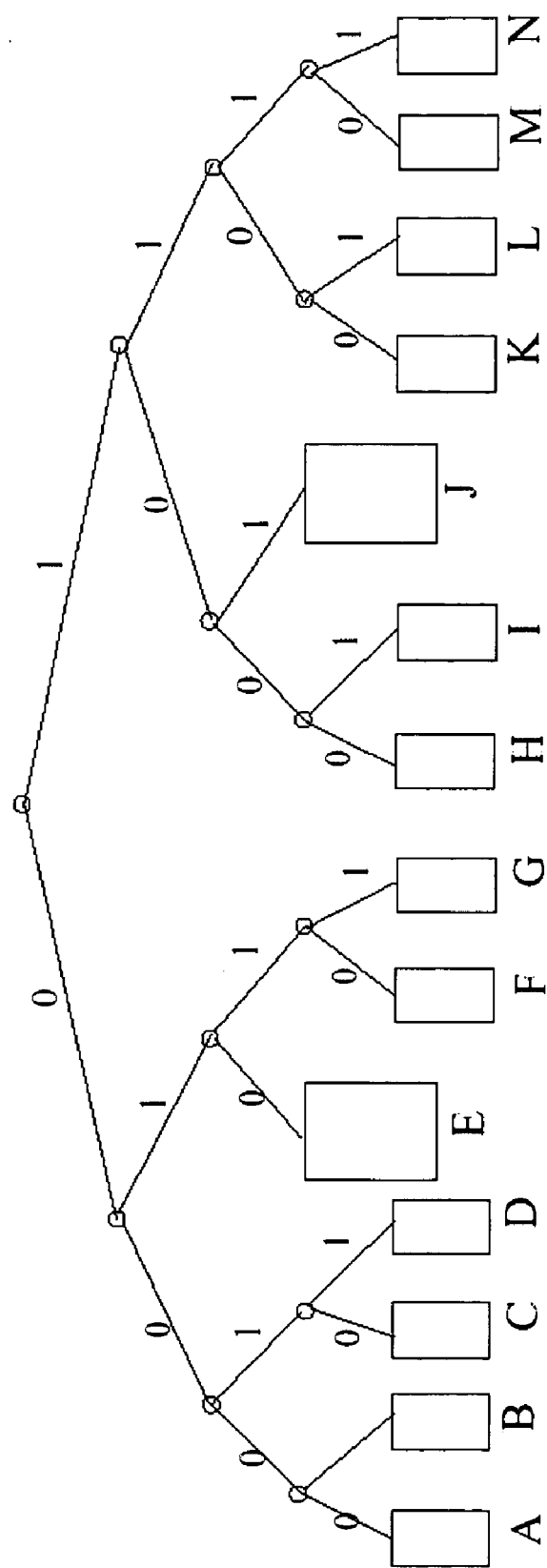
FIG. 3 is a more complicated example of a hash key arrangement depicted as an abstract tree diagram.

FIG. 5 shows an illustrative jump table based on the network of prefixes shown in FIG. 3. Consider the two bit dimension starting at the first bit. The jump table for zone "E" with a prefix of 010 in this dimension would have a table as shown in FIG. 5. As another example, consider a zone with a prefix of 01101100101 with a 3-bit dimension which is in bold. The prefix associated with the entry defined by index "5" would be defined as 01101110101, i.e. the dimension bits (in bold) are replaced with the binary representation of 5, namely 101. For a dimension consisting of 3 bits, there are 8 possible combinations, and its jump table has 8 entries, each with a different index ranging from 0 to 7.

Changes to a jump table in a given bit dimension are propagated periodically in pings to neighbors along bits of this dimension. Before attaching a jump table to the ping, the sender can trim it of nodes which cannot be used by the destination (this may happen when two neighboring nodes have different length prefixes assigned to them). It can be shown that in a stable state for any two FPN nodes such that they should include each other in their jump tables, there exists at least one path between these nodes such that none of these nodes is trimmed from exchanged jump table entries in any hop (i.e., both nodes will eventually learn about each other and update their jump tables accordingly). A receiving zone updates its jump tables as a part of the state reconciliation procedure using what are referred to as "zone versions" to select the latest destination zone location. For example, the version can be a number incremented when the zone is recovered or moved to a different host. If there is no zone merging, the longer prefix can "win" in cases of overlapping zones. If zone merging is required, entries can be aged with each ping cycle and this age can be used to decide which information is newer.

If B is the number of dimension bits, full jump tables can be constructed in B ping cycles on all zones involved. Exchanging jump tables in pings increases ping sizes, but overall this increase is reduced by attaching a jump table entry only if it has been changed since the last ping was confirmed by the same destination. If d is the number of dimensions, and all of them have the same number of bits, then the total number of destinations maintained by one zone in all jump tables is $O(dn^{1/d})$ where n is the number of zones in the system, whereas the number of zone's neighbors is $O(\log(n))$. This is true as long as the network is balanced within some constant factor, i.e., the difference between the longest and shortest prefix in the network is limited by a constant.

Basic routing can be done by resolving bits in a hashkey. It is preferable to resolve bits in a systematic fashion, e.g., from left-to-right (or right-to-left) so that one never loses track of bits that have already been resolved. It can be shown that in a stable state, one can always resolve the leftmost unresolved bit. Routing bit-by-bit results in a number of hops on the order of logarithm of number of zones. For large networks, this results in big latencies, especially when some steps are over long distances in the physical space. To reduce the number of hops, it is advantageous to take advantage of the jump tables.

Figure 4:
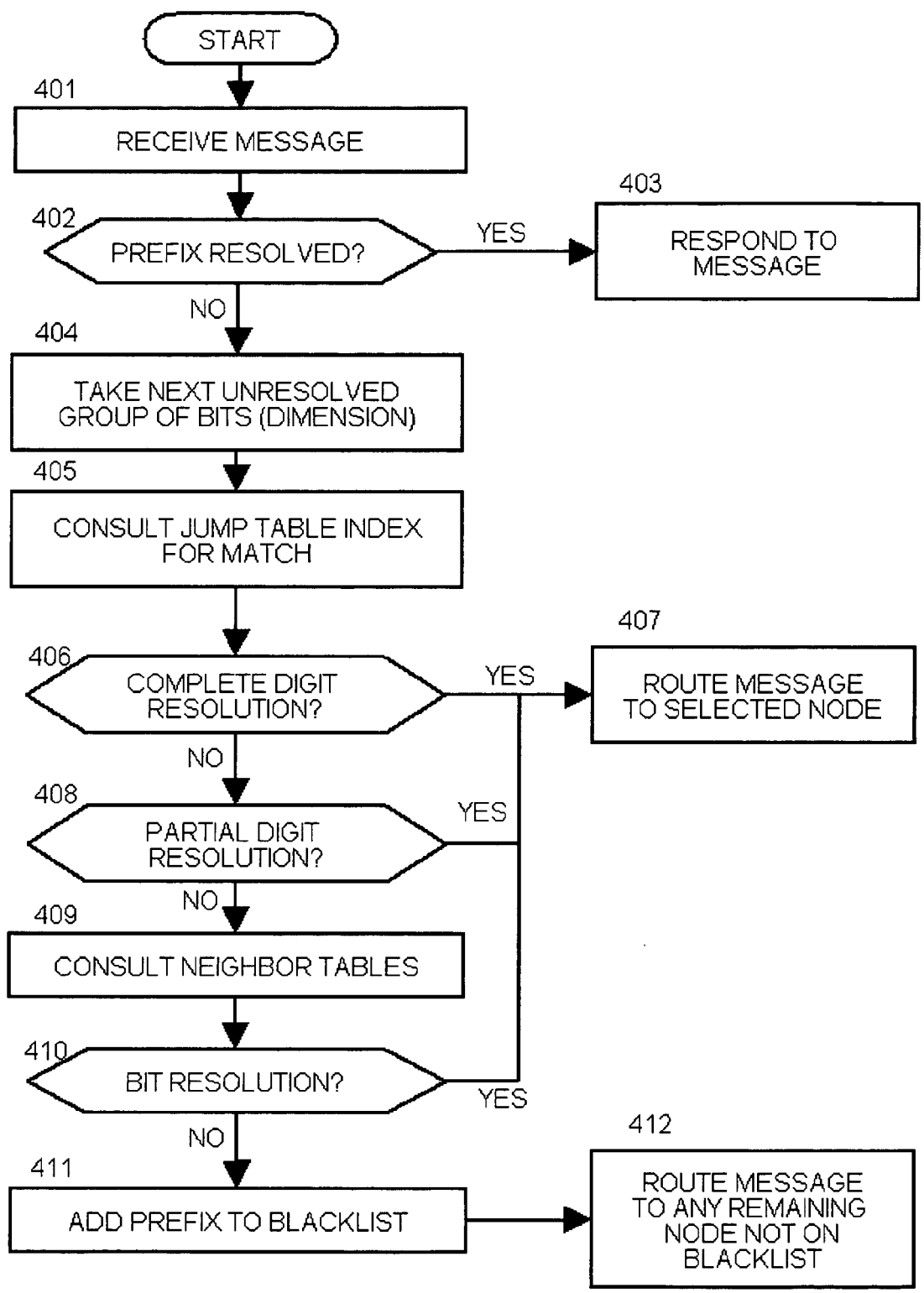
FIG. 4 is a flowchart of routing processing performed in accordance with an embodiment of an aspect of the invention.

FIG. 4 is a flowchart of a routing performed in accordance with an embodiment of an aspect of the invention. At step 401, a message is received that identifies a destination hashkey K. At step 402, it is checked whether the FPN node has a prefix that matches the prefix of the destination hashkey. If it does, then, at step 403, the FPN node handles the message and responds as appropriate.

If the node's prefix does not match the prefix of the destination hashkey, then the next unresolved group of bits, i.e., the next dimension in the hashkey prefix, is extracted at step 404. At step 405, the jump table for that particular dimension is consulted to resolve the next unresolved digit. In a "healthy" network, the jump table should have an entry for the unresolved digit, resulting a complete digit resolution at step 406. At step 407, the message is routed to the selected node as specified by the jump table. If the same dimension size is used by all zones, the maximum routing length is limited by the number of dimensions in the longest prefix, provided there are no failures in the network and the jump tables are up-to-date.

If it is not possible to resolve one of the unresolved digits, perhaps because there is a network failure or the jump tables are out-of-date, the jump table is used at step 408 to obtain a partial digit resolution so as to optimize some useful metric. For example, an attempt can be made to resolve more than one bit and maximally reduce what the inventors refer to as a "lexicographical order distance." Consider a prefix P and a hashkey K. Let $K|_P$ be the prefix of K with the same number of bits as in P. The lexicographical order distance between P and K, referred to as LexDist, is defined to be the bit string given by:

$$\text{LexDist}(P,K) = \text{XOR}(P, K|_P)$$

Note that LexDist(P, K) contains all zeros iff this prefix zone includes the hashkey K, and at a given moment of time there is only one such prefix in a stable FPN network. The prefix P1 is said to reduce LexDist to a given hashkey K compared to prefix P2 iff LexDist(P1, K) is before LexDist(P2, K) in a standard lexicographical order.

If it is not possible to obtain even a partial digit resolution using the jump tables, then the neighbor tables are consulted at step 409. An attempt is made using the neighbor tables to resolve any one of the unresolved bits.

If it is not even possible to obtain any bit resolution, then the node's prefix is added to what the inventors refer to a "blacklist" of destinations. This is to avoid trying to deliver a message to a destination which has been already tried. This list remains empty if no failures happen. At step 411, the prefix is added to the blacklist and any remaining node not on the blacklist yet is selected form the nodes in the jump tables and the neighbor tables. The source zone in this hop is called a "back-track" zone, as we increase here the LexDist to the destination.

It is preferable that routing take into account the possibility of multiple failures. Since there is no guarantee in such a scenario on the number of hops it can take to deliver a message, it is also advantageous to control the "lifetime" of the message in the network. Accordingly, it is preferable to specify two counters: e.g., a "time-to-live" (TTL) counter decremented at each attempted hop; and an "attempts-to-live" (ATL) counter decremented each time an attempt is made to directly deliver a message to its destination. Each message is injected in the network with positive values of these counters; when first of them reaches zero, the message is dropped. The TTL counter limits the number of hops a message can make, which helps in limiting congestion in a system with failures, even when the routing protocol cannot lead to an endless loop. The ATL counter is introduced because a failure to deliver a message directly to the destination does not necessarily mean the destination zone is dead—for example, it could have been moved to a different host, but the source jump table has not been updated yet. Moreover, the underlying communication protocol may fail independently of the destination node failure.

In a network without failures, the above routing approach uses only the jump tables to obtain a complete digit resolution. The other steps are used as needed and preferably only for one hop. For a next hop, on a new node, routing preferably resumes using the jump tables. All of the steps except steps 411-412 should reduce the LexDist to the destination, so routing using these steps should not visit the same node twice. An already visited node can be selected if steps 411-412 are used. However, the initiating zone of this step would be added to the blacklist, so with each hop produced by the last step, another possible destination is eliminated. As a result, routing should not loop forever, even without the above-mentioned TTL guard. Consider a network with a set of failed nodes and destination zones defined by jump and neighbor tables. Assume there are permanent node failures only (i.e., no link failure and no intermittent node failures), the network is not growing and jump tables are up-to-date. Then, it can be shown that with large enough TTL, the routing approach discussed above will eventually deliver each message to the alive destination provided there is a path between the message source and destination such that in each step LexDist is reduced. This is because, as discussed above, the routing mechanism cannot loop forever and a given zone is eliminated only if its host is dead or if LexDist cannot be reduced when trying to arrange for the next hop from this zone.

Changes to the topology of the FPN network can be caused by key insertions which eventually cause exhaustion of available storage on a zone or node; node additions; or node failures. It is preferable for the network to adapt to these events. There are a variety of different mechanisms for dealing with such changes, and the following is merely illustrative.

When the storage allocated to a particular zone is exhausted, the zone can be split. The zone split operation advantageously can be implemented by creating two "children" zones out of the parent zone. The prefixes of the two children can be derived from the parent prefix by appending zero and one respectively. The parent's neighbors are split between the children, with some neighbors possibly retained by both. This operation is local: the children zones replace the parent on the node hosting it. Usually, a zone is split when its size reaches SlotSize; in certain cases, the split may also be necessary during node addition. A split may trigger the transfer of a zone to some other physical node.

A zone must be evicted when the storage on a physical node is exhausted or when the number of hosted zones becomes greater than the number of available slots. Generally a physical node can become a new host for a zone F only if it satisfies the following preconditions: (a) the candidate has at least one free slot; and (b) the free space of the candidate after the move must be at least 6 higher than the free space at the source before the move, where δ is equal to half the storage used by F. This condition also prevents thrashing. Since information about the new host of this zone is not propagated instantly to all node which may keep pointers to it, a forwarding pointer can be left on the old host in a data structure which the inventors call a "trace cache". Since the new location will eventually be propagated through pings, the forwarding pointer can be discarded after the estimated propagation time.

Adding a physical node requires first locating the FPN network. This is referred to as a bootstrap phase and can be done by associating a DNS domain name with a given FPN network. After locating the FPN network, the new physical node searches for a physical node hosting multiple zones. This search need not be a global one, only a fixed number of physical nodes need be contacted. If found, one such zone can be transferred to the new physical node. If only physical nodes with one zone are found, one such zone can be split generating two children zones and one of them can be transferred to the new physical node.

It is advantageous to provide for failure recovery mechanisms in the FPN network. Each non-zero prefix F can have an associated "recovery hashkey" which is defined by flipping the least significant bit equal to 1 of F to 0 and extending F with zeros. For example, a recovery hashkey of 10110 can be defined as 10100 extended with zeros. For prefix consisting of all bits equal to zero, a recovery hashkey can be defined as the one with all bits equal to 1 and extending the neighborhood definition in the FPN network in such a way that two FPN nodes responsible for these two hashkeys are also neighbors. An FPN node responsible for recovery hashkey of F is referred to as a "recoverer" for F. By definition, in a stable network there is exactly one recoverer for each F, and a recovery node of F is a neighbor of F.

When an alive FPN node A detects a dead neighbor D, it can check if A is a recoverer for D. If yes, A recovers for D on the local host, otherwise no action is taken. This new incarnation D may decide to immediately transfer to a different host, depending on the load of the local host. When D is created, it knows only about its one neighbor, namely A. Next, D recreates its remaining neighbors by periodically sending special resolve messages addressed with neighbor prefixes not yet covered by any known neighbor and extended with zeros. Each such resolve message returns with an information about the FPN node responsible for a given hashkey, if such node is alive. Otherwise, if it is dead, and the information about it is kept by some other node on the way of the resolve message, this node returns the information about the dead zone to D. If D is a recoverer for this prefix, it in turns recovers this dead zone on the local node. To cut the number of resolve messages, an FPN node can maintain neighbors-of-neighbors sets with pings. In such a case, the recoverer will be able to give the new incarnation information about its neighbors.

The system advantageously provides a mechanism through which the dimension size can be increased on-line. This mechanism can be used to keep the number of dimensions (and indirectly the path length) constant. For example, a policy of maximum path length can be specified. If some request is routed longer than a given maximum number of hops, the originating node can trigger a dimension increase. As nodes are added to the system, a split may cause the creation of a zone whose prefix is longer than the number of dimensions times the dimension size (in bits), which triggers a dimension increase.

The dimension increase is communicated to neighboring nodes with ping messages giving and requesting a table of a new size. The zone re-arranges its jump tables according to the new digit size (with some entries initially empty), and communicates the new size to neighbors through pings. In response to pings requesting a dimension increase, the neighbors adjust their tables according to the bigger size, and further propagate the changes with their pings. The neighbor will respond with a jump table of a proper new size—presumably with some entries set to "No Routing" initially. This new table size will be propagated across the FPN network with ping messages. In case of multiple nodes changing dimension in the same time, a maximum jump table size can be selected as part of the reconciliation procedure. Eventually, every node changes its dimension size, so in this sense, it is a global operation. However, the dimension change can be done lazily while the system continues normal operation. Moreover, each node changes its dimension size only once in each period when the overall system size increases by the factor of $2^d$ where d is the number of dimensions. Since d is at least 2, a node will change its dimension no more than once while the system size is quadrupled.

The dynamic change of dimension size contributes to the efficient use of resources and overall system longevity. Systems based on existing prior art distributed hash tables can be used to deliver fixed routing length up to large numbers of nodes by planning for a maximum size of network, but this is not efficient because it requires pre-allocation of resources. Moreover, a fixed routing length is not assured once the system size exceeds the size for which it has been planned. Past experience has shown that the rapid progress in technology makes yesterday's assumptions obsolete very fast. For example, current technology state makes it feasible for an average node of today to hold two digit jump tables for a one million node system; in ten years from now, the average node then may be able to keep two digit jump tables for a network a thousand times bigger. And by using dynamic change of dimension size, it is possible to upgrade such a system on-line without a need for recreating it from scratch.

Figure 6:
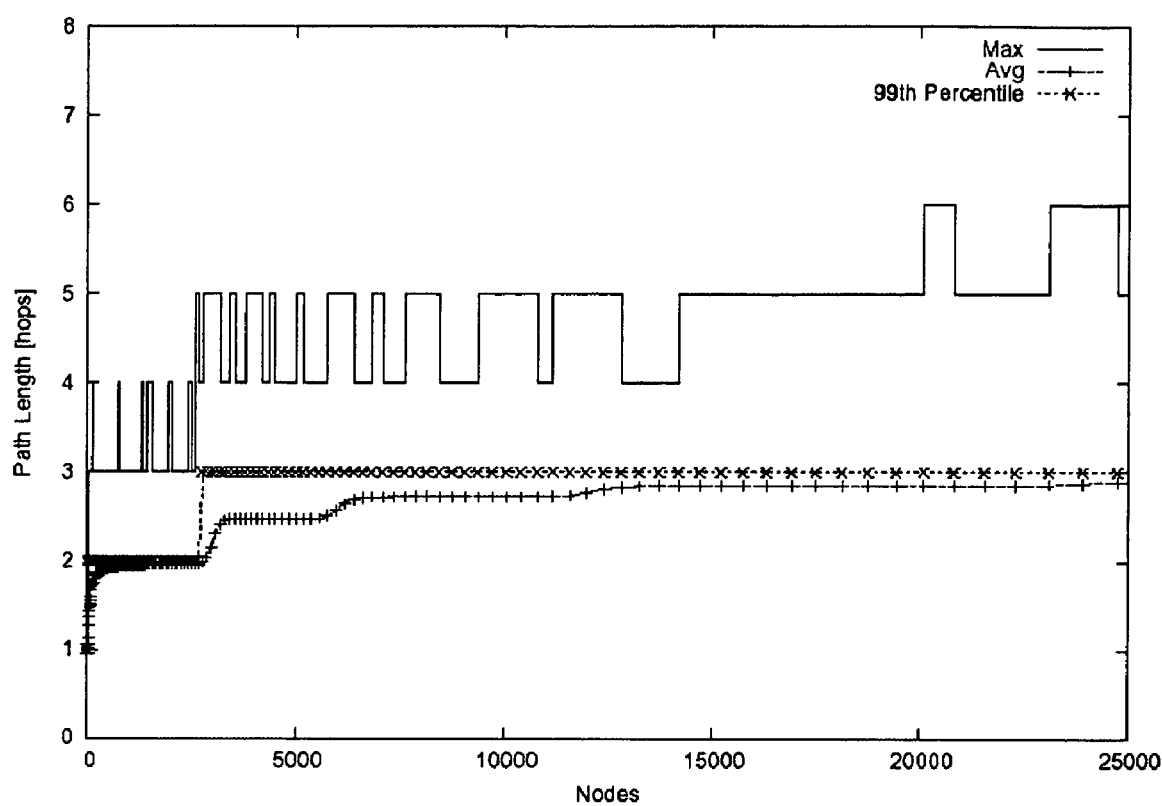
FIG. 6 is a chart showing path lengths in a simulation of a growing network with no failures.

FIG. 6 is a chart showing path lengths in a simulation of a growing network with no failures. The inventors constructed a simulation built of physical nodes, each with a capacity of 1000 keys. The system tries to maintain routing path length equal to 3, i.e., the number of digits is 3 with each digit dynamically increased as the system grows. For each message, the TTL counter is set to 20, and the ATL counter is set to 3. The frequency of requests (reads and/or writes) per node per ping cycle was set to 5. A growing network was simulated with an equal number of reads and writes generated per node. The writes fill up the nodes causing the network to grow. A new node is added when the global system utilization reaches a pre-defined target, in this case 70%. The growing network simulation was performed until the system reached the maximum number of nodes shown and the results were cumulative up to each number of nodes.

As shown in FIG. 6, the above-described routing mechanism delivers an average path length below 3, with 99 percent of messages delivered in no more than 3 hops for all sizes. However as the system grows, zones are transferred, causing some routing tables to contain stale addresses. The routing copes with this by forwarding the messages using the trace cache, but this increases the maximum number of hops to 6. This situation is only temporary as routing tables are eventually repaired with ping exchanges.

Figure 7:
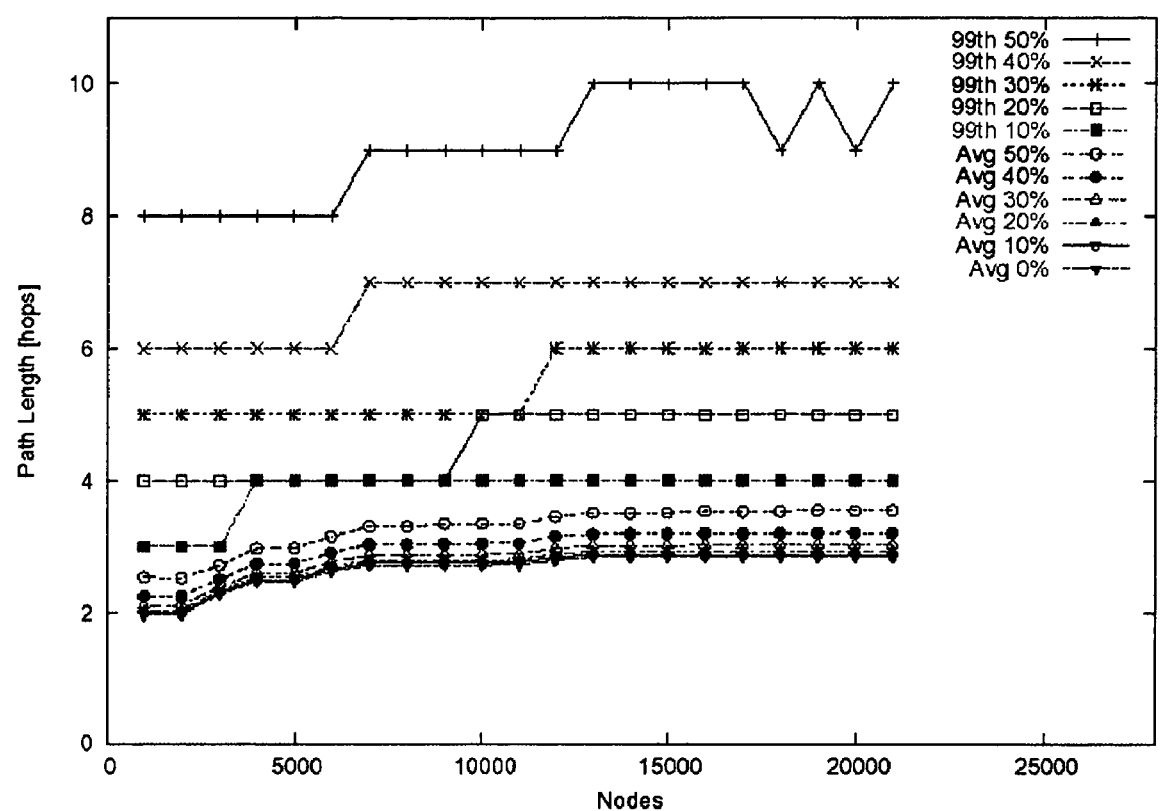
FIG. 7 is a chart showing path lengths in a simulation of a network with failures during stabilization.

FIG. 7 is a chart showing path lengths in a simulation of a network with failures during stabilization. A fraction of nodes from 10% up to 50% are failed simultaneously in steps of 10%. Immediately after the one-time failure of a given fraction of nodes, there is a stabilization period in which information about failures is propagated with pings. FIG. 7 shows the average and the 99th percentile path length for each percentage of nodes failed. It can be observed that the fraction of nodes failed has limited impact on the average path length. For a system of 20,000 nodes, the average path length increased by about 25% (from 2.84 to 3.55) when 50% of the nodes failed. The 99th percentile path length grows with the percentage of nodes failed reaching 10 when half of the nodes failed. It can also be shown that the routing load increases for stabilizing the network with failures. The average load per physical node can increase from 137 messages in a simulated healthy network case up to 306 messages routed per node when half of the nodes failed. The routing load imbalance defined as the ratio of max to average loads is in the range of 3.15 to 3.99 for the network with failures and 2.26 for a healthy network. For the growing network case, the routing load in the case of no failures is well balanced with the maximum routing load slightly above a factor of 2 of the average.

It will be appreciated that those skilled in the art will be able to devise numerous arrangements and variations which, although not explicitly shown or described herein, embody the principles of the invention and are within their spirit and scope.

What is claimed is:

1. A method for routing in a peer-to-peer network, the method comprising the steps of:
receiving a message comprising a hash key of a hash function, the hash key further comprising a fixed portion which is associated with one of a plurality of zones in the peer-to-peer network and where the fixed portion comprises a string of bits that is further grouped into a number of disjoint groupings of bits;
consulting a jump table which associates combinations of the groupings of bits with routing destination zones in the peer-to-peer network; and
if an entry is found on the jump table which associates a destination zone with a next unresolved grouping of bits in the fixed portion of the hash key, then routing the message to the destination zone in the peer-to-peer network so that the message can be routed in a fixed path length to a final destination zone associated with the fixed portion of the hash key.

2. The method of claim 1 wherein if an entry is not found on the jump table, then a next destination zone is selected which partially resolves the next unresolved grouping of bits in the fixed portion of the hash key so as to reduce a distance metric to the final destination zone in the peer-to-peer network.

3. The method of claim 2 wherein the next destination zone is selected by consulting the jump table to partially resolve some bits in the next unresolved grouping of bits in the fixed portion of the hash key.

4. The method of claim 2 wherein the next destination zone is selected by consulting a table of neighboring zones to resolve at least one bit in the next unresolved grouping of bits in the fixed portion of the hash key.

5. The method of claim 2 wherein, if an optimal next destination zone cannot be selected, a blacklist of destination zones already tried by the message is maintained with the message and the message is routed to a destination zone not on the blacklist.

6. The method of claim 2 wherein the distance metric is based on a lexicographical order distance from the string of bits in the fixed portion of the hash key.

7. The method of claim 1 wherein, if the jump tables are up-to-date, the message is routed to the final destination zone in the peer-to-peer network in a number of hops equal to the number of groupings of bits.

8. The method of claim 7 wherein the jump table can be recomputed when changes occur in the peer-to-peer network by resizing the groupings of bits so that the number of hops remains constant.

9. The method of claim 1 wherein the fixed portion of the hash key is a prefix of the hash key.

10. A method for use in a peer-to-peer network, the method comprising the steps of:
associating a fixed portion of hash keys of a hash function with one of a plurality of zones in the peer-to-peer network, where each hash key generated from the hash function is associated with an object in the peer-to-peer network and where the fixed portion of the hash key comprises a string of bits that is further grouped into a number of disjoint groupings of bits; and maintaining state for each zone in the peer-to-peer network regarding the groupings of bits so as to route messages to a destination zone in the peer-to-peer network in a fixed path length.

11. The method of claim 10 wherein the state for each zone of the peer-to-peer network is recomputed if the peer-to-peer network changes so as to maintain the fixed path length.

12. The method of claim 10 wherein the fixed path length has a number of hops equal to the number of groupings of bits.

13. The method of claim 10 wherein the state maintained for a zone further comprises a jump table which associates combinations of the groupings of bits with destination zones in the peer-to-peer network.

14. The method of claim 10 wherein a zone in the peer-to-peer network may be split into a first and second children zones by expanding the fixed portion of the hash key by at least one bit and associating the hash keys associated with the zone to either the first or second children zones.

15. The method of claim 10 wherein the fixed portion of the hash key is a prefix of the hash key.

16. A computer-readable medium comprising instructions for routing in a peer-to-peer network, the instructions when executed on a computer perform the method of:

receiving a message comprising a hash key of a hash function, the hash key further comprising a fixed portion which is associated with one of a plurality of zones in the peer-to-peer network and where the fixed portion comprises a string of bits that is further grouped into a number of groupings of bits;

consulting a jump table which associates combinations of the groupings of bits with routing destination zones in the peer-to-peer network; and if an entry is found on the jump table which associates a destination zone with a next unresolved grouping of bits in the fixed portion of the hash key, then routing the message to the destination zone in the peer-to-peer network so that the message can be routed in a fixed path length to a final destination zone associated with the fixed portion of the hash key.

17. The computer-readable medium of claim 16 wherein if an entry is not found on the jump table, then a next destination zone is selected which partially resolves the next unresolved grouping of bits in the fixed portion of the hash key so as to reduce a distance metric to the final destination zone in the peer-to-peer network.

18. The computer-readable medium of claim 17 wherein the next destination zone is selected by consulting the jump table to partially resolve some bits in the next unresolved grouping of bits in the fixed portion of the hash key.

19. The computer-readable medium of claim 17 wherein the next destination zone is selected by consulting a table of neighboring zones to resolve at least one bit in the next unresolved grouping of bits in the fixed portion of the hash key.

20. The computer-readable medium of claim 17 wherein, if an optimal next destination zone cannot be selected, a blacklist of destination zones already tried by the message is maintained and the message is routed to a destination zone not on the blacklist.

21. The computer-readable medium of claim 17 wherein the distance metric is based on a lexicographical order distance from the string of bits in the fixed portion of the hash key.

22. The computer-readable medium of claim 16 wherein, if the jump tables are up-to-date, the message is routed to the final destination zone in the peer-to-peer network in a number of hops equal to the number of groupings of bits.

23. The computer-readable medium of claim 22 wherein the jump table can be recomputed when changes occur in the peer-to-peer network by resizing the groupings of bits so that the number of hops remains constant.

24. The computer-readable medium of claim 16 wherein the fixed portion of the hash key is a prefix of the hash key.

25. A node for a peer-to-peer network comprising:

a first interface for communication with other nodes in the peer-to-peer network;

a second interface to at least one storage device, the second interface storing objects on the storage device where each object stored at the node is associated with a hash key of a hash function where each hash key has a fixed portion associated with a zone of the peer-to-peer network hosted at the node;

a memory unit for storing state for the zone in the peer-to-peer network hosted at the node, the state comprising associations between groupings of bits in the fixed portion of the hash key and destination zones in the peer-to-peer network a routing processor which can route messages in the peer-to-peer network using the first interface and the state stored on the memory unit so that a message can be routed to a destination zone in the peer-to-peer network in a fixed path length.

26. The node of claim 25 wherein the state stored in the memory unit can be recomputed if the peer-to-peer network changes so as to maintain the fixed path length.

27. The node of claim 25 wherein the fixed path length has a number of hops equal to a number of the groupings of bits in the fixed portion of the hash key.

28. The node of claim 25 wherein the fixed portion of the hash key is a prefix of the hash key.

* * * * *